APPARATUS FOR FACILITATING ELECTRONIC ASSEMBLY

Filed Oct. 29, 1969 3 Sheets-Sheet 1

INVENTOR

ROBIN J. FREEMAN

BY Imirie, Smiley, Snyder & Butrum

Attys.

APPARATUS FOR FACILITATING ELECTRONIC ASSEMBLY

Filed Oct. 29, 1969 3 Sheets-Sheet 2

INVENTOR

ROBIN J. FREEMAN

BY Imirie, Smiley, Snyder + Butrum

Attys.

Oct. 5, 1971 R. J. FREEMAN 3,609,846

APPARATUS FOR FACILITATING ELECTRONIC ASSEMBLY

Filed Oct. 29, 1969 3 Sheets-Sheet 3

INVENTOR

ROBIN J. FREEMAN

BY Emrich, Smiley, Snyder & Butrum

Attys.

United States Patent Office 3,609,846

Patented Oct. 5, 1971

3,609,846

APPARATUS FOR FACILITATING ELECTRONIC ASSEMBLY

Robin John Freeman, Send Road, Send, Woking, Surrey, England

Filed Oct. 29, 1969, Ser. No. 872,119
Int. Cl. H05k *13/04*; B23g *17/00*
U.S. Cl. 29—203 B 4 Claims

ABSTRACT OF THE DISCLOSURE

The invention provides apparatus for facilitating the assembly of components into their correct position in printed circuit boards. The apparatus includes dummy circuit boards, one of which gives a visual indication of component positions and the other of which is employed in the signalling of appropriate component storage bins; and movement of styluses over the dummy boards causes simultaneous spot illumination of component positions on an actual board to be assembled.

This invention is concerned with the assembly of electronic components into printed circuit boards.

It is an object of the invention to facilitate such assembly by the provision of a machine by which the location and identity of the various components is displayed.

According to the invention, from one aspect, there is provided a machine for facilitating the assembly of electronic components into printed circuit boards in which movement of a stylus consecutively into holes in a replica or dummy board simultaneously causes illumination of equivalent holes in a board to be assembled and the lighting of signal lamps on appropriate component storage bins.

From another aspect of the invention there is provided a machine for facilitating the assembly of electronic components into a printed circuit board comprising a transversely and longitudinally shiftable carriage bearing a stylus and an electric contactor, a rear-illuminated replica circuit board provided with through holes in equivalent positions to component locations in an actual circuit board, a similar replica board fitted with electrical contact posts in each hole so as to connect with selected ones of a plurality of contacts in a base plate, wires connecting the said contacts to signal lamps mounted in component storage bins, and a spotlight mounted in an extension of the shiftable carriage above the actual circuit board, the arrangement being such the movement of the carriage to permit the stylus to be located over any through hole in the first replica board simultaneously causes connection of the contactor with an equivalent contact post in the second replica board and movement of the spotlight into position to illuminate an equivalent hole in the actual circuit board, whereby an indication is given to an operator of the component bin containing components appropriate for fitment to the illuminated location on the actual circuit board.

According to the invention from yet another point of view, there is provided a machine for facilitating the assembly of electronic components into printed circuit boards in which an illuminated indicator for the positioning of components in an actual circuit board is simulated by a replica board having back-illuminated through holes which are consecutively obturated by light obscuring means as and when an actuator is manually operated on completion of a particular component assembly, so that obturation of the total number of the said through holes indicates the total assembly of components in the actual circuit board.

The above and other features of the invention are embodied in one preferred form of apparatus, which will now be described in some detail by way of example with reference to the accompanying drawings, in which.

Figure 1:
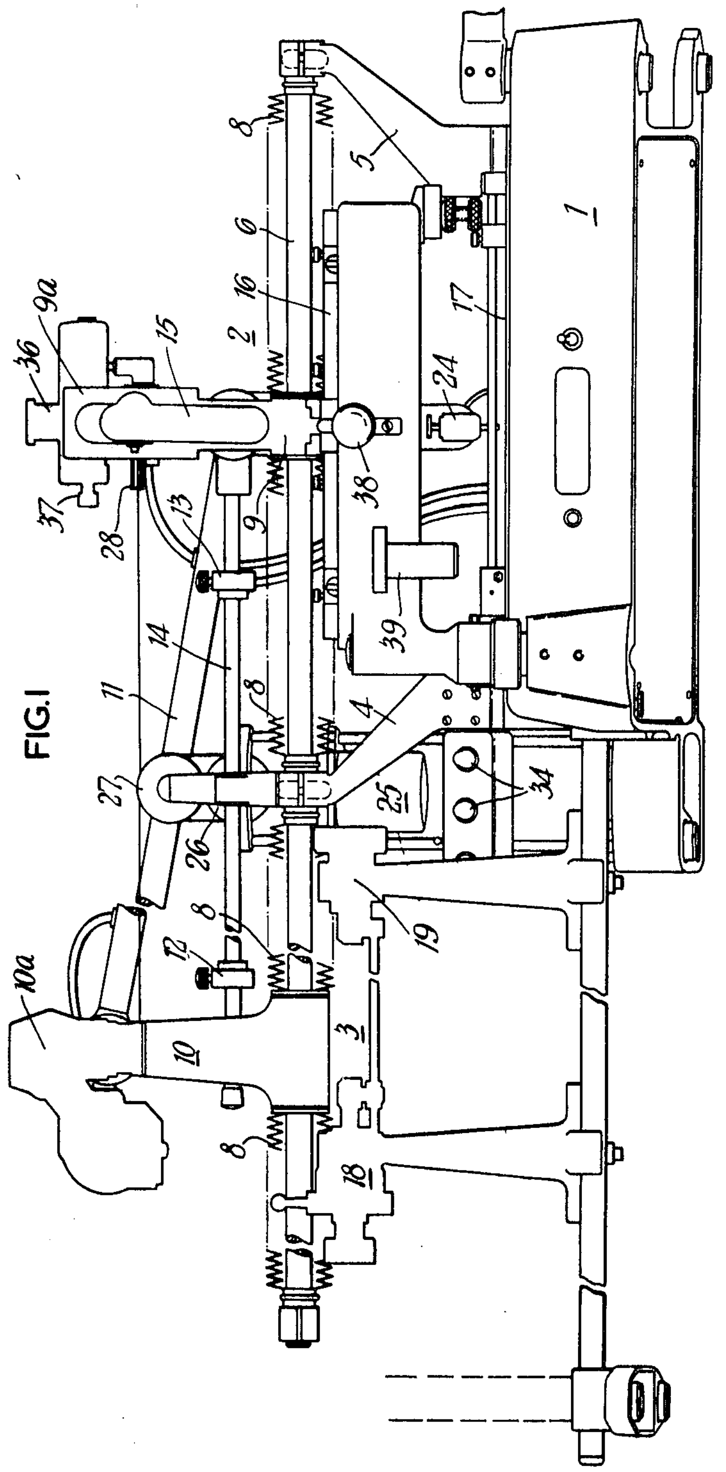
FIG. 1 is a side elevation of the apparatus.

The apparatus comprises a chassis or casing 1 which provides an indicator station 2 and an assembly station 3 alongside one another.

Upstanding brackets 4 and 5 carry a pair of recirculating ball shafts 6 and 7 protected by dust-excluding bellows 8.

Slide mountings 9 and 10 of a ball-feeding stylus 9*a* and a spotlight projection head 10*a*, interconected by a linking beam 11, are slidable along shafts 6 and 7 between positions limited by stops 12 and 13 on shaft 14 by means of the handle 15 on the stylus 9*a*.

A table 16 for reception of a through-drilled replica circuit board is mounted directly above and in alignment with a multiple contact board 17.

Holders 18 and 19 for a circuit board to be fitted with components are located at the assembly station 3.

Figure 2:
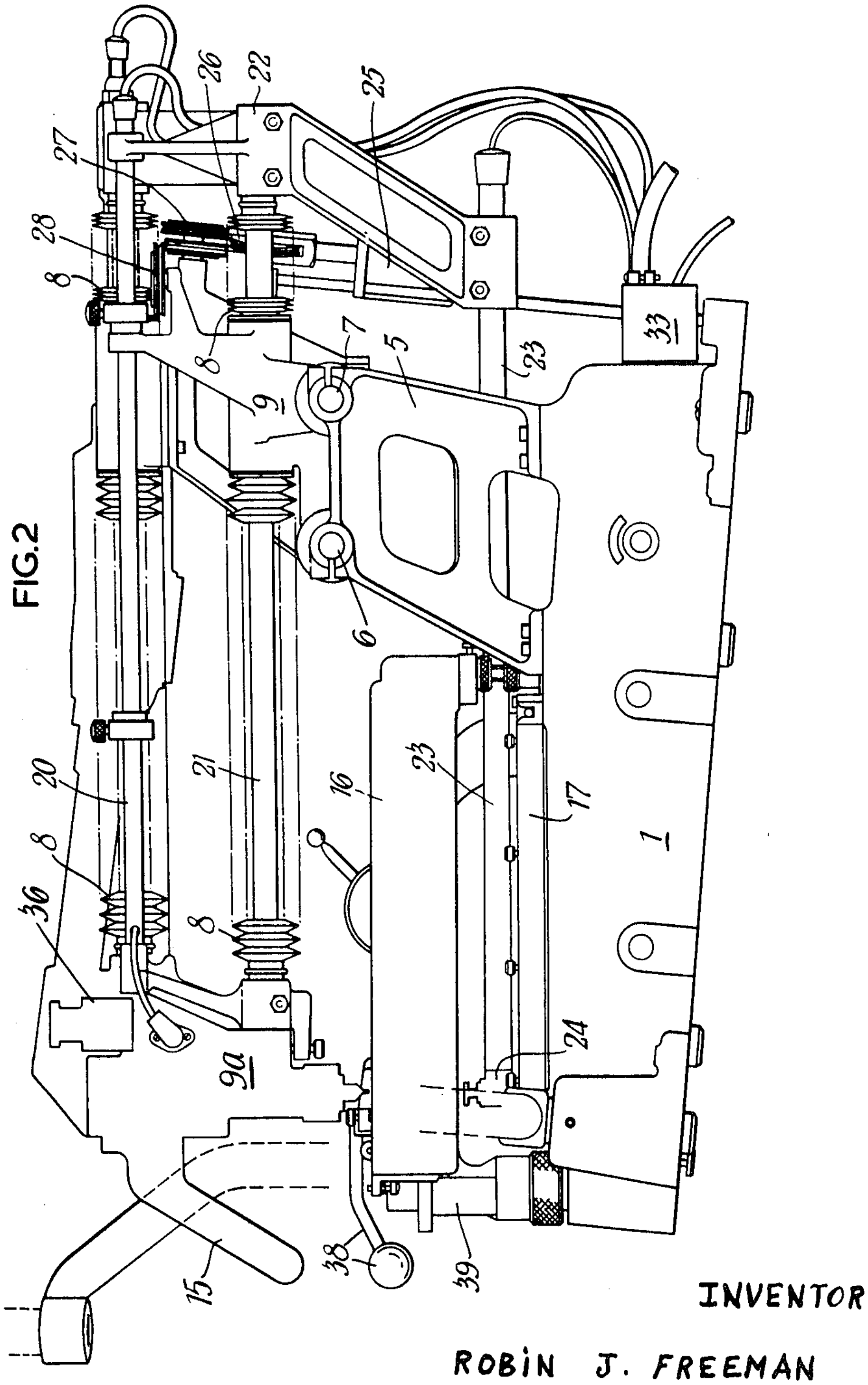
FIG. 2 is an end view of the apparatus of FIG. 1.

From FIG. 2 it will be seen that the ball feed stylus 9*a* is carried on vertically spaced shafts 20 and 21 protected by dust-excluding bellows 8.

The shafts 20 and 21 are slidable through slide mounting 9 and are interconnected by the bracket fitting 22, which also carries the mounting shaft 23 of an electric contact-making stylus 24.

The stylus 24 is located immediately below and in alignment with the ball-feeding stylus 9*a* and is moved with it in both longitudinal and transverse directions.

A counter balance weight 25 and pulley system 26, 27, 28 carried by brackets 4 and associated with linking beam 11, stylus 9*a* and head 10*a* compensates their weight and relieves sliding friction.

It will be noted from FIG. 2 that the chassis 1 is sloped downwardly towards the front or operator's position.

Figure 3:
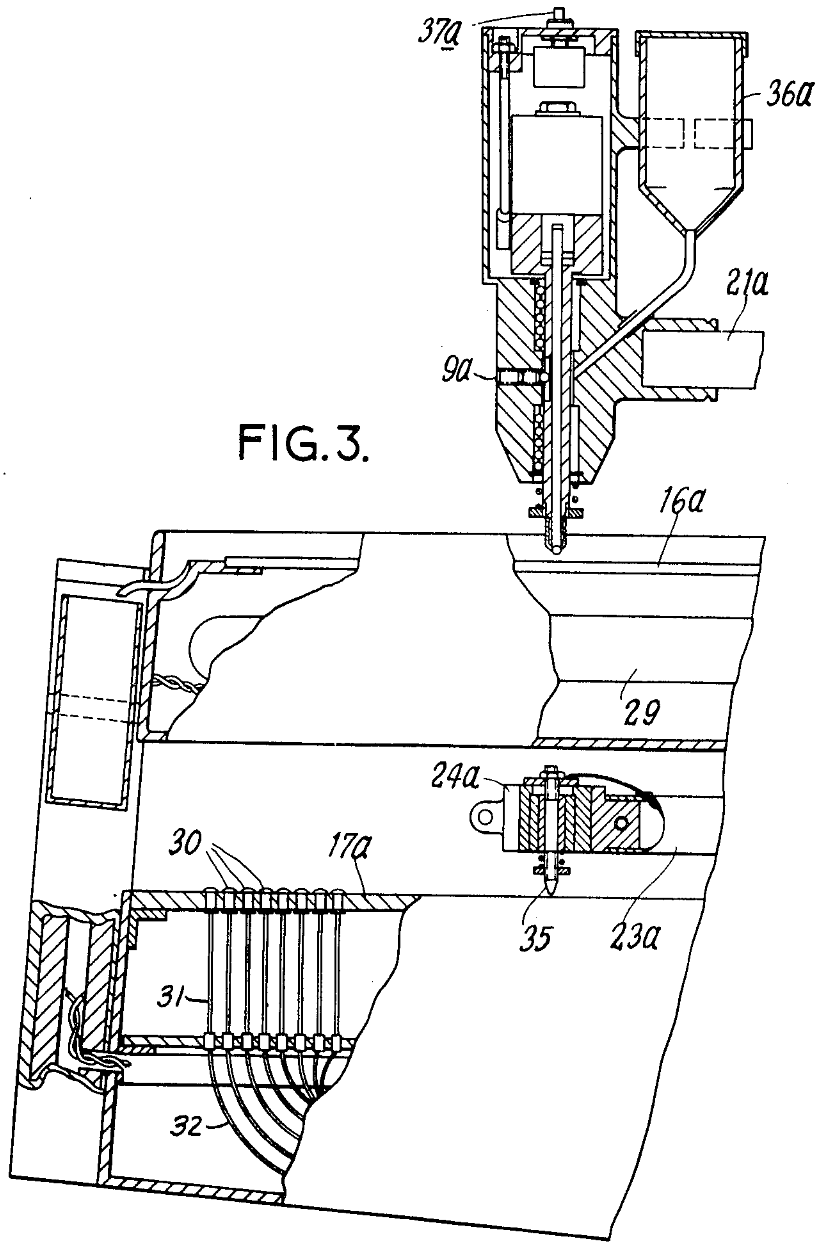
FIG. 3 is a scrap section showing the construction of a stylus and contactor such as employed in the apparatus of FIGS. 1 and 2, but as arranged in an earlier prototype.

Referring now to FIG. 3, which (as stated) is a scrap section of a prototype, a single mounting rod 21*a* carries the ball-feeding stylus 9*a* and a mounting rod 23*a* carries the electrical contact stylus 24*a*. The styluses move together in both directions, as those in FIGS. 1 and 2.

The replica circuit board table 16*a* consists of a glass sheet and illuminated from beneath by fluorescent lamps 29, while the multiple contact table 17*a* is made of insulating material and is fitted with several hundred electrical contacts 30.

The contacts 30 are connected by wires 31 and push-on wires 32 to multi-way plugs, such as 33 (FIG. 2), to indicator lamps on component bins, such as 34 (FIG. 1).

A duplicate replican board (not shown) is fitted over the table 16*a*, and holes therein expose selected contact studs 30.

The stylus 24*a* has a lightly sprung contactor tip 35, which completes the circuit to an indicating lamp when it touches a contact stud 30.

Replica circuit boards (not shown) is placed upon the tables 16*a* and 17*a*. These boards are through drilled in positions corresponding to component positions on an actual printed circuit board fixed in holders 18 and 19 at the assembly station such as 3 (FIG. 1).

The ball-feeding stylus 9*a* includes a hopper 36*a* (36 in FIGS. 1 and 2) for a large number of small ball bearings, one of which is released upon each operation of a switch button 37*a* (37 in FIG 1).

The operation of the machine is as follows:

An actual printed circuit board to be fitted with components is fixed in the holders 18, 19 and a replica board is fitted over the table 16. A handle 38 is provided for fitting this board, as will be described later.

The operator moves the handle 15 to bring the stylus 9*a* immediately above one of the through holes in the replica board on table 16. This brings the electrical stylus contactor tip 35 into contact with one of the studs 30 exposed through the corresponding hole in the board on table 17, and causes illumination of one of the indicator lamps 34 on component storage bins located alongside the assembly station 3. The bins carry polarity indications as required.

Simultaneously with the movement of the styluses 9*a* and 24, the spotlight projection head 10*a* is shifted over the actual circuit board to illuminate the position where the component from the indicated bin is to be fitted.

Having fitted the component, the operator presses the switch 37 and a ball-bearing is ejected into the hole beneath the stylus 9*a*, thus obscuring its illumination from the fluorescent lamps 29.

The handle 15 is moved to bring the stylus 9*a* above another hole in the upper replica board and the sequence of operations is repeated.

Finally, when all the holes in the replica boards have been obscured indicating that all the requisite components have been fitted in the actual circuit board, the handle 38 is raised to lift the replica board, thus allowing the balls to fall through the holes therein and roll down the table 16 to a collection hopper 39.

I claim:

1. A machine for facilitating the assembly of electronic components into a printed circuit board comprising a transversely and longitudinally shiftable carriage bearing a stylus and electric contactor, a rear-illuminated replica circuit board provided with through holes in equivalent positions to component locations in an actual circuit board, a similar replica board fitted with electrical contact posts in each hole so as to connect with selected ones of a plurality of contacts in a base plate, wires connecting the said contacts to signal lamps mounted in component storage bins, and a spotlight mounted in an extension of the shiftable carriage above the actual circuit board, the arrangement being such that movement of the carriage to permit the stylus to be located over any through hole in the first replica board simultaneously causes connection of the contactor with an equivalent contact post in the second replica board and movement of the spotlight into position to illuminate an equivalent holes in the actual circuit board, whereby an indication is given to an operator of the component bin containing components appropriate for fitment to the illuminated location on the actual circuit board.

2. A machine according to claim 1 including manually operable means for the release of light obscuring balls from the said stylus into the holes in the said rear illuminated replica board.

3. A machine according to claim 1 in which the said rear illuminated replica board is mounted upon a sloping table and is provided with a handle by which it may be lifted.

4. A machine according to claim 1 including a manually operated actuator to release light-obscuring means into each through hole of the rear illuminated replica board consecutively on completion of a particular component assembly, so that obturation of the total number of the said through holes indicates the total assemly of components in the actual circuit board.

References Cited

UNITED STATES PATENTS

| | | | |
|---|---|---|---|
| 2,959,848 | 11/1960 | Savitt | 29—407 |
| 3,372,455 | 3/1968 | Howie | 29—203 B |
| 3,506,911 | 4/1970 | Stone | 29—203 B |
| 3,523,353 | 8/1970 | Drinkard et al. | 29—203 B |

THOMAS H. EAGER, Primary Examiner

U.S. Cl. X.R.

29—203 P, 407; 340—225